United States Patent [19]

Urbutis

[11] Patent Number: 4,578,842
[45] Date of Patent: Apr. 1, 1986

[54] METHOD AND APPARATUS FOR COMPACTING SHIRRED CASING

[75] Inventor: Algimantas P. Urbutis, Palos Heights, Ill.

[73] Assignee: Union Carbide Corporation, Danbury, Conn.

[21] Appl. No.: 436,057

[22] Filed: Oct. 22, 1982

[51] Int. Cl.[4] ............................................. A22C 13/02
[52] U.S. Cl. ............................................ 17/45; 17/1 R; 17/49
[58] Field of Search .................. 17/1 R, 41, 42, 49, 17/45

[56] References Cited

U.S. PATENT DOCUMENTS

| | | | |
|---|---|---|---|
| 2,001,461 | 5/1935 | Hewitt | 17/45 |
| 3,112,517 | 12/1963 | Ives | 17/42 |
| 3,209,398 | 10/1965 | Ziolko | 17/42 |
| 3,315,300 | 4/1967 | Ziolko | 17/42 |
| 3,366,368 | 1/1968 | Hibbing | 259/45 |
| 3,633,492 | 1/1972 | Gilvar | 100/3 |

Primary Examiner—Willie G. Abercrombie
Attorney, Agent, or Firm—Roger Aceto

[57] ABSTRACT

A method and apparatus for compacting strands of shirred casing by applying substantially equal and opposite forces simultaneously to both ends of the strand. In one embodiment this double-ended simultaneous compaction is achieved by compacting the strand about a sliding sleeve and against a restraint so that movement of a compaction arm against only one end of the strand will cause the sleeve to slide with respect to the restraint.

30 Claims, 22 Drawing Figures

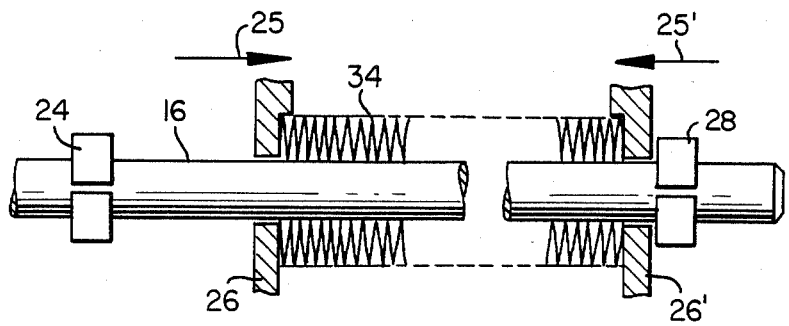
FIG. 9
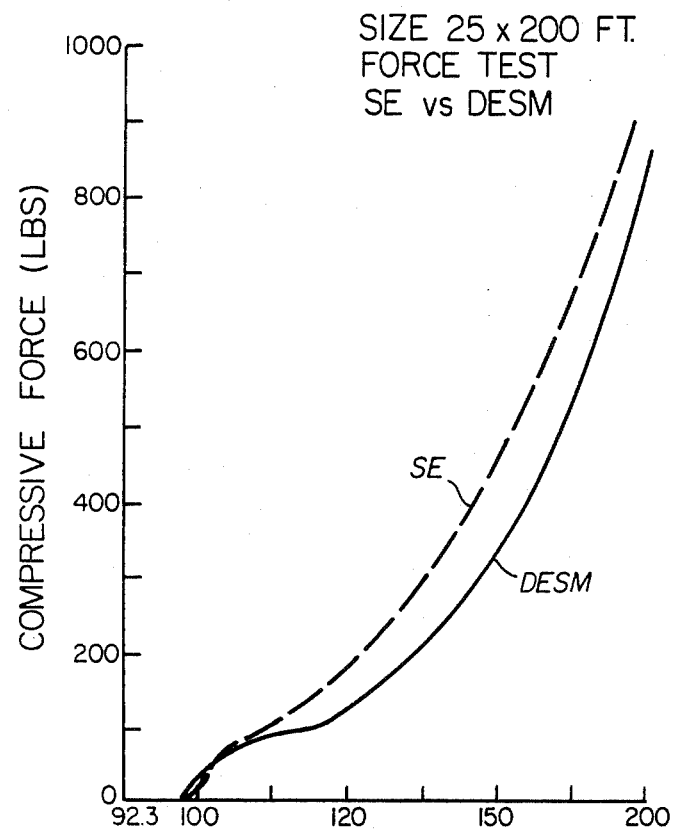
FIG. 13    PACK RATIO (in/in) = $\dfrac{2400}{L_s}$
SIZE 25 x 200 FT.
FORCE TEST
SE vs DESM COMPRESSED PACK RATIO DISTRIBUTION. SIZE 21 x 200 FT.
UNCORED SIZE 21 x 200 FT.
CORED ON RPVC

METHOD AND APPARATUS FOR COMPACTING SHIRRED CASING

BACKGROUND OF THE INVENTION

The present invention relates generally to shirred cellulosic food casing articles and to apparatus and manufacturing methods. In particular, the invention relates to such an article compacted to form a shirred casing stick which exhibits a more uniform pack ratio over the length of the article than shirred casing sticks compacted to the same length by prior art methods.

The invention also relates, in particular, to a compaction method for achieving a relatively high pack ratio over the length of the article, for reducing casing damage, and for increasing the pack ratio obtainable for a given compaction force.

Shirred tubular casings are well known in the art. Such casings are extensively used in food processing to make a variety of sausage type products and in the packaging of larger food products such as cooked and smoked ham and the like.

Casings are of several different types and sizes to accommodate the different categories of food products to be prepared. Moreover, casings can be reinforced as needed, such as by embedding a fibrous support web in the casing wall for added strength.

Casings employed in the preparation of small size sausage products, such as frankfurters, are generally designated "small food casings". As the name suggests, this type of food casing is small in stuffed diameter. Generally, it has an inflated diameter within the range of from about 13 mm to about 40 mm. Small food casings are most usually supplied as thin-walled tubes of very great length. For convenience in handling and use, lengths of these casings are shirred and compressed to produce what is commonly referred to in the art as "shirred casing sticks". A shirred casing stick is an integral, self-supporting article from about 20 cm to about 60 cm in length which contains from 20 to about 50 meters (2000 to 5000 cm) of casing. Shirring machines and shirred casing sticks are shown in U.S. Pat. Nos. 2,983,949 and 2,984,574, among others.

"Large size food casing", is the common designation for casings used in the preparation of generally larger food products, such as salami and bologna sausages, meat loaves, cooked and smoked ham butts, and the like. The stuffed diameter of large size food casings range from about 40 mm to about 200 mm or even larger. In general, large size food casings have a wall thickness about three times greater than the wall thickness of "small size casings" and are provided with a fibrous web reinforcement embedded in the wall, although they may be prepared without such reinforcement. Large size casings of both types have been, and are being, supplied in the form of shirred sticks containing up to 65 meters of casings for stuffing with high speed apparatus.

Shirring techniques for the casings described hereinabove, in accordance with patent references noted, as well as with others, can be generally described as involving the continuous feeding of a length of flat casing feed stock, from a roll for instance, onto a mandrel of a shirring machine. The flat casing is inflated with low pressure gas, usually air. Then the inflated casing is passed through an array of shirring rolls or other shirring means which pleat the casing up against a restraint, on or about the mandrel, until a preselected shirred length has been attained.

The pleats formed in conventional shirring operations are usually laid at an angle to the axis of the mandrel so that the pleats can be described as nesting one into the other, much like a stack of nesting conical elements. Shirring in cooperation with conventional hold back means compacts the nested pleats. After the shirring operation, a strand of the shirred casing is subjected to an axial compressive force which further compacts the shirred casing to form the shirred casing stick.

A shirred casing stick is generally a coherent, self-supporting article which is capable of handling by conventional automatic stuffing apparatus. The coherency or ability of the stick to maintain a structural and mechanical integrity during the rigors of packaging, storage and handling is thought to be the result of the nesting pleats being forced into a closer association, one to another, by the compacting process.

Shirring machines are generally of two types, a floating mandrel type and a withdrawing mandrel type. With a floating mandrel type of shirring machine, as described for example in U.S. Pat. No. 3,766,603, a strand of the shirred casing is transferred linearly, beyond or away from the restraint against which the shirring was performed, and onto an extended mandrel portion. In this new location, the strand of shirred casing is compacted by an axially applied force to produce a coherent, self-supporting shirred casing stick length, which may be about 1.0 percent to about 1.2 or 1.3 percent of the original, unshirred, casing length.

Similar results are achieved with a withdrawing mandrel shirring machine, as shown for example in U.S. Pat. No. 2,583,654; except that in this type of machine, the shirring mandrel, with the shirred casing thereon, is rotated or otherwise indexed to an alternative position where the shirred casing is compacted.

Compaction is described in the art in terms of "pack ratio" which is simply the ratio of the length of the unshirred casing to the length of the shirred, compacted casing stick. This ratio, generally, has been in the order of 70 to 100; that is 70 to 100 feet of casing being shirred and compacted to a stick measuring about one foot in length. One U.S. Pat. No. 2,001,461, speculates that the lowest practical limit of length reduction is in the neighborhood of 1/130th (i.e., a pack ratio of 130), but indicates a preferred length reduction of about 1/80th (i.e., pack ratio of 80).

It should be appreciated that sticks having high pack ratios are desired for optimum operation of a continuous, automatic stuffing machine. The greater the length of casing that is compacted into a relatively short stick, the greater the amount of stuffed product that can be made before the supply of casing is depleted.

While shirred casing sticks having high pack ratios are desired, as a practical matter there are a number of factors which tend to discourage manufacture of sticks having pack ratios much in excess of about 70 to 100.

For example, as the pack ratio increases, the likelihood of casing damage increases. This damage is manifested by pinholes in the casing. Pin holes are thought to be caused by the friction between adjacent pleats of the shirred casing as the compaction force pushes the pleats axially one against the other, and by friction between the pleats and the mandrel. As a general rule, there should be no more than $1\frac{1}{2}$ pinholes per 10,000 feet of casing.

Also, it is known that when a shirred casing stick is compacted, the diameter of its bore tends to decrease. This is believed to be caused by the individual pleats of the shirred casing being forced to assume a more upright orientation by the axially applied compacting force. This causes the pleats to expand or otherwise grow inwardly as the shirred casing is compacted axially. A decrease in the diameter of the stick bore is manifested by the tendency of the stick to seize about the mandrel during compaction.

It is also known that even after the compaction force is released and the stick is doffed from the mandrel, the bore will continue to grow smaller over a period of time. This inward growth of the pleats, both during the compaction process and, subsequently, after doffing, has been found to vary in direct proportion to the magnitude of the compaction force. The greater the force applied to increase pack ratio, the greater the likelihood of the pleats seizing about the mandrel and growing inward after doffing, both of which tend to occlude the bore of the stick.

Any reduction in bore diameter of the stick is in opposition to the desirable feature of having as large a bore diameter as possible. Maintaining as large a stick bore as possible is desirable because it will permit the stick to fit over, or otherwise accommodate, the largest stuffing horn in terms of cross sectional area for a given casing size. This is important because it is generally desirable to stuff at the lowest possible pressure. Maximizing the internal cross sectional area of the stuffing horn will maximize product throughput at minimum stuffing pressure.

Concurrent with bore reduction, it is also recognized that the compacted casing stick will begin to grow and elongate as soon as the compacting force is released. The greatest proportion of growth occurs immediately after the compacting force is released. Thereafter, the growth gradually diminishes. Accordingly, it is recognized in the art that a compacted shirred casing stick is resilient and has the potential of storing a portion of the energy exerted in compacting the shirred casing.

Stick growth will reduce peak ratio (casing length divided by stick length) so this requires the compacting operation to produce a stick which has a higher pack ratio than the desired, finished, or doffed stick pack ratio. Consequently, it may be necessary to subject the casing to the likelihood of pinhole damage from high compaction forces even though the pack ratio of the finished or doffed stick is below a pack ratio range causing such damage.

It has been found that the magnitude of the forces generated by both the inward growth of the pleats and stick expansion as set out above, are proportional to the longitudinal compacting force used to compress the stick to the compressed length. That is, the axial and radial inward forces generated by the compacted stick, increase as the longitudinal compacting force increases.

It also has been observed, particularly for the small size casings used to make frankfurter type products, that when a shirred stick is highly compacted in an effort to maximize its pack ratio, the coherency or structural integrity of the compressed stick deteriorates to a point whereby the stick is rendered nonfunctional. The stick becomes fragile, is easily broken, and cannot be automatically handled by a stuffing machine, nor mounted on a stuffing horn. Since the shirring process is known to produce pleats which nest one with another, much the same as a stack of nested cones, it is speculated that this loss of coherency when excessive compaction forces are applied, occurs because such forces tend to straighten out the "nesting cone" geometry produced during the shirring process. Thus, while compaction is needed to form a coherent stick, increasing the compaction force beyond some point will work to reduce coherency.

Prior to the present invention, compaction of a shirred casing was accomplished by any one of several single-ended compression methods accomplished with the shirred stick on a mandrel.

In single-ended compression, a first end of the shirred casing is held against a restraint while a movable compaction arm applies an axial force to a free second end of the casing. After compaction in this manner, the casing is doffed from the mandrel.

In another variation, the force is applied first to one end and then to the other. In this case, the strand of shirred casing first undergoes a single-ended compression as set out above. Then, the restraint is released and shifted to hold the second end of the casing while an axial force is applied to the first end. This can be accomplished by doffing the shirred casing stick in order to turn it end for end on the mandrel, by turning the mandrel end for end with the casing stick still mounted thereon, or by opening the restraint to pass the shirred casing along the mandrel, and then closing the restraint and applying an axial force in the reverse direction.

In the latter variation, the force is applied first to the one end and then to the other, so the term single-ended "sequential compression" would be an apt description of the method. Compaction methods as set out above are more particularly described in U.S. Pat. Nos. 2,001,461, 3,209,398 and 3,112,517.

"Compaction", as used herein, should be understood to mean compaction while controlling the inside diameter or bore size of the shirred casing. This requires compaction about a member which establishes the desired inside diameter of the shirred casing during compaction to limit inward growth of the casing pleats. Prior art patents as discussed below, while silent on the aspect of controlling bore size, are assumed to provide such control, and therefore, are subject to the generation of frictional forces between the casing and the mandrel on which the casing is compacted.

Hewitt, U.S. Pat. No. 2,001,461 and Ziolko, U.S. Pat. No. 3,209,398, show versions of single-ended compression. In Hewitt, the shirred casing is dropped over a plunger (mandrel) wherein upward movement of the plunger through an abutment compresses the shirred casing against the abutment. According to Hewitt, the highest practical limit of pack ratio probably is in the neighborhood of 130, while a preferred range is about 80. Ziolko, likewise shows moving a mandrel through a casing restraint or abutment. Ziolko, in addition, moves the casing through successive compression stations to apply an increasing axial force to the shirred casing.

Ives, U.S. Pat. No. 3,112,517 shows a sequential compression wherein the casing is transferred along a mandrel for compression, first in one direction, and then in the other.

Compacting a shirred casing on a mandrel, as in both single-ended and single-ended sequential methods, does, to some extent, control bore size, because the pleats cannot expand inward beyond the outside diameter of the mandrel. However, when applying the relatively high compaction forces needed to obtain doffed pack ratios greater than about 70, the inwardly growing pleats frictionally engage about the mandrel. This frictional engagement adds to the likelihood of the stick seizing on the mandrel and to the likelihood of pinholes or other casing damage.

Coating the mandrel with a friction reducing material, is known in the art and does not completely alleviate the problem. As an alternative, one could use a mandrel having a small diameter compared to the bore size of the shirred casing. While this would eliminate, or considerably reduce, friction between the mandrel and casing during compaction, it also has the negative effect of allowing the pleats freedom to grow inwardly, thereby losing control over the bore size of the shirred casing stick.

Even discounting damage to the casing when using a mandrel to control bore size, friction between the casing and mandrel is a limiting factor to obtaining high pack ratios, for still another reason. In this respect, greater and greater forces must be applied to overcome the increasing friction between the pleats and mandrel as the pleats grow inward and seize about the mandrel. At some point, a limit is reached wherein pinhole damage produced by the increasing compaction forces exceed acceptable limits.

Close examination of shirred casing sticks made according to the prior art methods of single-ended and single-ended sequential compaction, has disclosed a further pack ratio characteristic of these methods. For sticks made with single-ended compression, the pack ratio gradually diminishes from one end of the stick to the other. In its compacted condition, the restrained end has the lower pack ratio, and the end nearest to the compacting arm, has the higher pack ratio. In sticks made with single-ended sequential compression, the pack ratio tends to be higher at each end and generally lower around the midpoint of the stick.

It is believed that friction between the pleats and the mandrel, as the pleats move along the mandrel, is the cause of this uneven pack ratio distribution. The end of the stick adjacent the compaction arm has its pleats compacting and growing inward to engage about the mandrel sooner than the pleats at the restrained end of the stick. Consequently, the resistance to compaction at the compaction arm increases as more and more pleats begin to frictionally engage the mandrel. In an extreme case, the end of the shirred casing farthest from the compaction arm would experience little or no compaction, because the applied compaction force is effectively resisted, or balanced, by the friction of the pleats towards the compaction arm. This theory seems to be substantiated by the pack ratio distribution as exhibited in sticks formed by single-ended sequential compression as set out hereinabove.

Casing length is another factor in the uniformity of the pack ratio distribution. The distribution is more uniform for shorter lengths of casing. As casing lengths increase, the uniformity of pack ratio tends to change over the length of the stick.

Maintaining a pack ratio as close as possible to the maximum (short of pinhole damage) over the full length of the stick translates to more casing per given stick length and a higher overall or average pack ratio. Having a near maximum pack ratio at one end of the stick, or the other, and a lower pack ratio at another part, translates to less casing per given stick length and a lower overall or "average" pack ratio.

In the production of shirred casing sticks, a goal in the art has been to maximize the amount of casing contained in a stick having a given bore diameter. This goal can be quantified by the packing efficiency (PE) of the stick.

Simply put, PE is a ratio indicative of the density of a shirred casing stick. It is computed by calculating the actual volume of casing material contained in a given shirred and compacted stick length, and then dividing by the volume of a solid object having the same dimensions of the shirred stick (ie. length, inside diameter and outside diameter).

From this relationship, it is seen that the maximum packing efficiency for any shirred stick is unity. Increasing the pack ratio works to increase the density of the stick and, therefore, the packing efficiency. Thus, the desire to maximize packing efficiency is another reason for wanting to increase the pack ratio to the maximum value short of pin hole damage and to obtain as constant a pack ratio over the full length of the stick as possible.

In practice, conventional shirred casing sticks have had characteristics representing a compromise from the characteristics of an "ideal" stick in order to balance the competing factors of: little or no growth in terms both of length and of reduction in bore size after removal of the compaction force; high pack ratio to maximize packing efficiency; coherency; and large inner diameter or bore size.

For example, all things being equal, a higher pack ratio can be produced by downsizing the mandrel to reduce friction, but, reducing mandrel size sacrifices control over bore size. Upsizing the mandrel to control bore size increases friction and sacrifices pack ratio.

In either case, applying more force to increase the pack ratio risks an increase in pinholing and increases the likelihood of bore reduction and stick growth after doffing.

In a copending application, Ser. No. 363,851 filed Apr. 5, 1982 in the name of Mahoney, et al, a shirred casing article, termed a "cored high density" or CHD article, is disclosed. A CHD article has a food casing shirred and highly compacted on a tubular core. As described in said patent application, acceptable CHD casing articles having higher than conventional packing efficiencies and pack ratios were obtained when the casing was shirred and compacted on a tubular core.

Use of a tubular core, which takes up space in the bore of the shirred casing, was expected to decrease the bore size of the finished article. Contrary to what was expected, it was found that by compacting about a core it was possible to compact longer than conventional casing lengths to higher than conventional pack ratios without a significant reduction in bore size.

Provided the core is sufficiently rigid to resist the axial and radial forces generated by the compacted casing, it was unexpectedly found that the space taken up by the core did not reduce the bore size. The core resisted inward growth of the casing, so that much higher forces could be applied to attain the higher pack ratios without the previously experienced consequence of bore reduction.

Other surprising results, and the advantages of compacting to a high pack ratio about a core, are more fully set out in said patent application. It is sufficient for purposes of the present invention merely to say that the data obtained from the examples, as set out in said patent application, clearly establishes the benefits of using a rigid tubular core to resist inward growth of shirred casing compacted to higher than conventional pack ratios. The data from said examples also demonstrates and confirms that elongation or growth in stick length occurs after the compacting forces have been released.

When producing a CHD article, wherein longer than conventional lengths of casing (up to 200 feet or more) are shirred and routinely compacted to higher than conventional pack ratios (above 100) about a tubular core, the disadvantages of single-ended and single-ended sequential compaction techniques becomes most evident.

In both techniques, the forces generated by the compacting casing contribute to core failure. In one aspect, cores were found to undergo a localized buckling compression failure during compaction as more and more of the axial compaction loading was transmitted to the core by the compacting casing. Cores which did not fail in this fashion sometimes collapsed or underwent a reduction in bore size, when doffed, due to the loading caused by radial inward expansion of the compacted casing.

The present invention seeks to provide a compaction method which permits an improvement in the desirable characteristics of a shirred casing stick. In particular, the compaction method of the present invention uses less force than prior art compaction methods to produce a given pack ratio. The present invention also is able to produce a stick having a more uniform pack ratio distribution over the length of the stick for a give compaction force than prior art compaction methods. The invention further permits an increase in the pack ratio over that which can be obtained with the same force applied in prior at compaction techniques, obtains higher pack ratios without increasing pinhole damage, and increases pack ratios while reducing the likelihood of a commensurate increase in stick growth or reduction in bore size.

When used in connection with CHD articles, as set out in the above mentioned copending patent application, the present invention provides a compaction method which reduces the tendency of the core to buckle or to collapse under the radially inward forces exerted by the casing on the core or to elongate after doffing.

With respect to the present invention, it has been found that the desirable attributes of a shirred casing stick, such as a greater pack ratio uniformity, low stick growth, maintenance of bore size after doffing from the compaction mandrel, as well as certain other advantages, can be achieved by a double-ended simultaneous compaction method.

In a double-ended simultaneous compaction method according to the present invention, both ends of the shirred casing are displaceable and are free to move with respect to the size controlling mandrel, each end toward the other responsive to forces applied simultaneously to both ends of the casing. It is believed that this method results in less friction between the casing and mandrel, and less opportunity for friction induced casing damage, so that greater, more uniform pack ratios can be achieved.

Shirred casings, compressed in this manner, have also evidenced less pinhole damage at higher pack ratios and have shown a reduced tendency to elongate or to undergo a reduction in bore size after doffing from the compaction mandrel.

Compaction to a given pack ratio according to a double-ended simultaneous method as described herein, is accomplished with less applied force than other prior art compaction techniques. Less applied force during compaction means there is less stored energy available for subsequent release by the compacted shirred casing stick in the form of stick growth and inward expansion of the individual pleats.

Elongation and reduction in bore size are further reduced in the case of casing articles using a core member as set out in the copending application mentioned above. This is due in part to the friction between the core and casing and the rigidity of the core material.

The compaction method of the present invention when used to compact a cored, shirred casing article, also affords the opportunity to capture the fully compacted length of casing on the core, as more fully described in a copending application, Ser. No. 434,559, filed Oct. 15, 1982, now U.S. Pat. No. 4,493,130.

It is possible to practice the method of the present invention on either a floating or withdrawing mandrel type of shirring machine, in several ways. For example, in one way, the shirred casing can have its midpoint fixed with respect to the mandrel, while forces are simultaneously applied to each end of the casing for moving each end relative to the mandrel and toward the midpoint. These forces can be applied by locating the casing between two compactor arms and then simultaneously moving each arm towards the other against the opposite ends of the casing.

In another arrangement, the casing is placed on a size controlling sleeve which can slide along the mandrel. One end of the casing is placed against an end restraint while the sleeve is allowed to slide through the restraint. This permits both ends of the casing to displace each toward the other and with respect to the sliding sleeve as a compaction force is applied to the other end of the casing. It is believed that allowing the sleeve the freedom to slide with respect to the mandrel and through the restraint, has the same effect as compacting the casing between two compaction arms which are moved together for the application of substantially simultaneous, equal and opposite forces to the ends of the shirred casing located about the sleeve.

SUMMARY OF THE INVENTION

In its broadest aspect, the present invention is characterized in one aspect thereof by a method for producing a shirred tubular casing article having a desired bore diameter including the steps of:

(a) locating a strand of shirred casing on a mandrel member extending axially through the strand with the strand of shirred casing having the pleats thereof in engagement with the mandrel member; and then (b) displacing simultaneously both ends of the strand of shirred casing relative to the mandrel member and each towards a midpoint of the strand by applying oppositely directed compacting forces to each end of the strand thereby displacing the pleats of the strand progressively and simultaneously in opposite directions axially inward from both ends against the frictional resistance to the displacement produced by attendant increased pressure of the pleats on the mandrel member.

In another aspect the method of the present invention is characterized by the steps of:

(a) providing an axially movable mandrel member having an outside diameter greater than the desired inside diameter of the article to be produced;

(b) locating a strand of shirred casing on and about the mandrel member;

(c) applying a restraint against a first end of the strand;

(d) applying a compacting force to the second end of the strand for moving the second end towards the first, the bore of the strand sufficiently reducing in size as a result of the compacting step to frictionally engage the mandrel member; and (e) allowing the mandrel member to slide freely with respect to the restrained first end during the compacting step, wherein the movement of the mandrel member is responsive to the casing-to-mandrel frictional engagement and the axial force applied to the strand. In its apparatus aspect the invention is characterized by:

(a) a mandrel member adapted to receive axially thereon a strand of shirred casing;

(b) compactor means engageable against the opposite ends of the strand for simultaneously displacing the ends longitudinally relative to the mandrel member, and each towards a midpoint of the strand under oppositely directed compacting forces which longitudinally displace and compress the pleats of the shirred strand progressively and simultaneously in opposite directions axially inward from both of the ends and against the frictional resistance to the displacement produced by attendant increased pressures of the pleats in the mandrel member.

DESCRIPTION OF THE DRAWINGS

FIG. 9 is a schematic drawing showing still another embodiment of the invention;

FIG. 13 is a graph showing the relative forces needed to compact like strands to the same length using different compaction methods.

DESCRIPTION OF THE PREFERRED EMBODIMENTS

Figure 1:
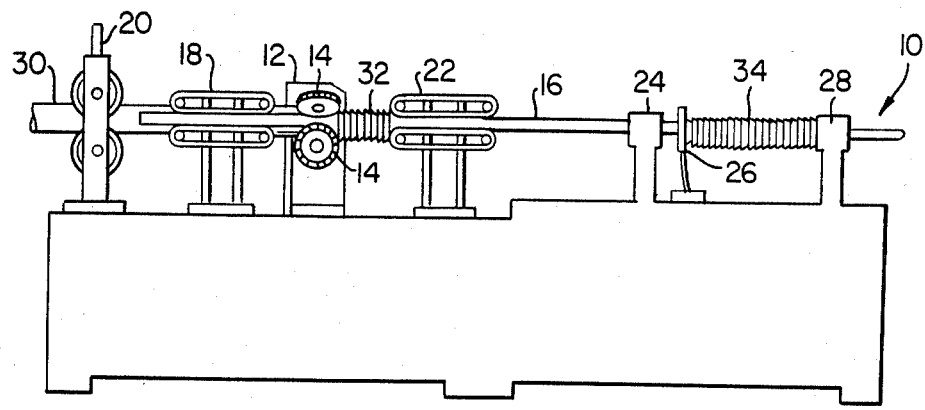
FIG. 1 is an elevational view of one apparatus which may be used to produce an article according to the present invention, the figure showing the shirring operation completed and showing a shirred casing length transported to the compacting section of the apparatus.

Referring to the drawings, FIG. 1 shows a typical floating mandrel-type shirring machine, generally indicated at 10. Shirring machines and the products thereof are shown in U.S. Pat. Nos. 2,983,949 and 2,984,574 among others.

A shirring head 12 is mounted on the machine, the head including a plurality of shirring wheels 14. These wheels, usually three in number, are of a general type which is described in U.S. Pat. No. 3,461,484.

Shirring wheels 14 are disposed about a mandrel 16 which extends generally the length of the machine. Also disposed about the mandrel, but forward of the shirring head 12, or to the left as viewed in the figure, are feed belts 18 and feed rollers 20. Disposed about the mandrel aft of the shirring head are hold back belts 22, a first clamp 24, a compactor arm 26 and a second clamp 28.

The operation of these components for shirring tubular casing is well known in the art. Briefly, an inflated casing 30 is fed onto mandrel 16 at the force end by feed rolls 20 and feed belts 18. This casing passes between shirring wheels 14 which shirr the casing in conjunction with holdback belts 22. As is known in the art, holdback belts 22 retard the advance of the casing passing from the shirring rolls in order to provide a substantially regular pleat formation and to partially compact the shirred casing shown at 32. It is also known to rotate the holdback means about the mandrel in order to impart a slight twist to the shirred casing. Twisting the shirred casing tends to produce straighter strands.

It should be appreciated that the operations of shirring and partially compacting the casing, lay the pleats of the shirred casing at an angle to the axis of mandrel 16 so that the individual pleats nest one against the other similar to a stack of nested cones.

After the initial shirring and partial compaction, a strand of the casing is separated, either adjacent the shirring wheels 14 or downstream of the holdback belts 22. This separated strand is transferred along the mandrel towards first clamp 24. First clamp 24 and compactor arm 26 both open to permit movement of the strand, either manually or by automatic means, to the compacting station which is between the first and second clamps. The operation of first clamp 24 and compactor arm 26 to permit such a transfer is conventional, and FIG. 1 shows a strand 34 of shirred and partly compact casing at the compacting station.

Figure 2:
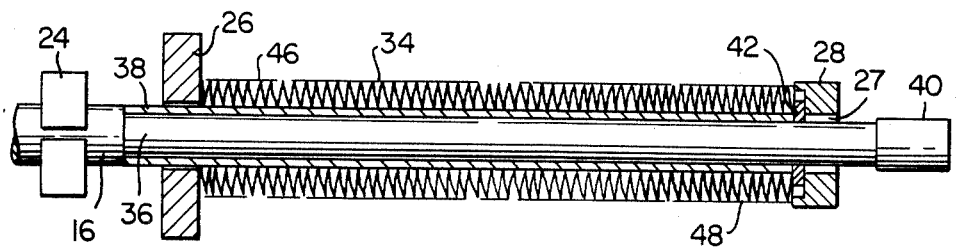
FIGS. 2-5 are views of the compacting section of the shirring apparatus on an enlarged scale showing the various compacting steps of the present invention.

More details of the compacting station are shown in FIG. 2. Mandrel 16 at the compacting station includes an inner shaft 36 and a sliding sleeve 38 mounted on the shaft. Shaft 36 and sleeve 38, while shown as being a part of, or an extension of, the mandrel, could be elements separate from the mandrel to which a shirred casing length is transferred for compacting.

Inner shaft 36 has a diameter, which is reduced from the full diameter of mandrel 16 so that sleeve 38 has its outside diameter substantially matching the outside diameter of the mandrel. This will permit strand 34 to transfer along the mandrel and onto the sleeve.

Sleeve 38 preferably is made from, or is coated with, a material that has a relatively low coefficient of friction and which is strong enough to withstand the forces generated by the inward expansion of the casing during compaction.

Sleeve 38 is adapted to slide freely along shaft 36 and through second clamp 28. For this purpose the second clamp, even when closed, provides a clearance space 27 for the free passage of the sleeve. Limits to the sliding movement of the sleeve are established at its fore end by the full diameter of mandrel 16 and at the aft end by an adjustable sleeve stop 40. Sleeve stop 40 is shown in FIGS. 2-5 as a member threaded onto the end of shaft 36 wherein the threaded engagement affords a means to adjust the position of the stop.

An intermediate limit to the travel of sleeve 28 is set by a sleeve retainer 42. This retainer is preferably part of second clamp 28 but can open or close independently of the second clamp for purposes set out hereinbelow.

In operation, first clamp 24 and compacting arm 26 are open to permit passage of a shirred and partly compacted casing length or strand 34 along the mandrel and onto sleeve 38. Sleeve retainer 42 is in a closed position about shaft 36 during the transfer operation to support the mandrel and to prevent the axial movement of the sleeve through clearance space 27 as the strand is being transferred onto the sleeve.

It should be appreciated that during the shirring operation, the bore size of the shirred casing is determined by the size of shirring mandrel 16, so that the outside diameter of the mandrel is selected to provide the desired inside diameter or bore size of the compacted shirred casing stick to be formed. Likewise, the outside diameter of sliding sleeve 38, in the embodiment as shown in FIGS. 2-5, would be selected to provide the desired bore size. As set out above, the bore size of the compacted casing will grow smaller after the compacted casing article is doffed from the mandrel. Accordingly, the outside diameter of the mandrel and sliding sleeve 38 is selected to be some size greater than the inside diameter of the desired article bore size to accommodate for this bore reduction.

Because the bore of the shirred casing and the outside diameter of both mandrel 16 and sliding sleeve 38 are substantially the same, there is, or may be, some frictional engagement between the shirred casing and sleeve, as strand 34 is moved along the mandrel and onto the sleeve. Accordingly, to prevent movement of the sleeve during casing transfer, sleeve retainer 42 is closed and abuts the end of the sleeve as shown in FIG. 2.

When strand 34 has been transferred past first clamp 24, both the clamp and the compactor arm 26 are closed. The compactor arm then operates to move against a first end 46 of strand 34, to push the strand along the sleeve, until the other end 48, of the strand, is restrained by abutment against sleeve retainer 42 (FIG. 2).

Sleeve retainer 42 now is opened to clear the end of sleeve 38. Movement of the compactor arm 26 in an aft direction, or towards second clamp 28, compacts the strand. As compactor arm 26 moves aft, it displaces and compacts the first end 46 of the strand towards the restrained end 48.

During compaction, individual pleats of the strand being displaced along the sleeve tend to grow or expand inward. If not restrained, this inward expansion will considerably reduce the bore size of the compacted shirred casing stick. The function of the mandrel, or the function of sliding sleeve 38, is to resist this inward growth.

As the compaction takes only a matter of seconds (less than 5), it is difficult to observe the interaction of the casing and sleeve during the time that the compaction arm 26 moves aft. What is speculated as happening during compaction is that as the compaction arm 26 moves aft, the pleats closest to the first end 46 of the strand are displaced longitudinally along the sleeve towards end 48. The pleats being displaced exert increasing pressures on the mandrel member and the resulting accumulating friction developing between the compacting pleats and sleeve 38 works to drive the sleeve through the second clamp 28. This sleeve movement, with respect to second clamp 28 causes the displacement and resulting compaction of the casing pleats adjacent clamp 28 along the sleeve and towards end 46. In this fashion compaction of both ends of the casing is thought to occur simultaneously wherein each end of the casing strand moves relative to the sleeve and towards a mid point of the casing strand.

Figure 3:
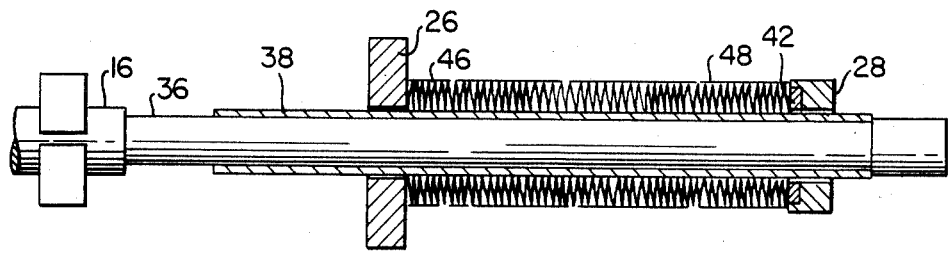

Movement of the ends of the casing strand is demonstrated by comparing, in the figures, the location of the strand ends 46, 48 relative to sleeve 38 at the start of the compaction (FIG. 2) and at the end of the compaction (FIG. 3).

In FIG. 2, the ends of the strand generally correspond to the ends of sleeve 38 whereas, the strand ends in FIG. 3 are each spaced inward from the respective ends of the sleeve. However, in each Figure, the alignment of the mid point of the sleeve with respect to the mid point of the strand does not significantly change.

Figure 4:
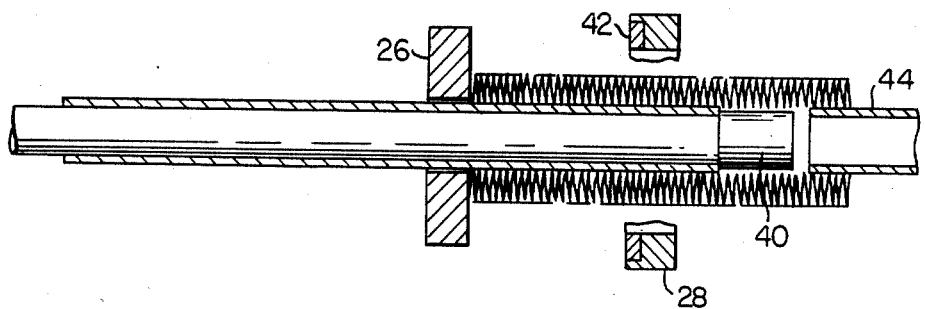

After compaction is complete, clamp 28 and sleeve retainer 42 are opened (FIG. 4). The strand, now compacted to a coherent stick, is doffed from the sleeve by further movement of compaction arm 26 along the mandrel. During the doffing step, the aft end of sleeve 38 engages against sleeve stop 40 which holds the sleeve to the shaft.

Figure 5:
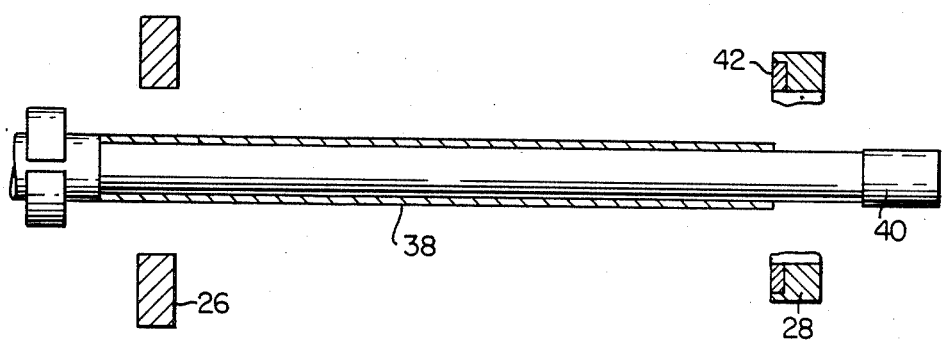

After doffing, compactor arm 26 opens and returns to a home position as shown in FIG. 5. The sleeve also returns to its home position. This can be done manually or by the operation of a return spring (not shown) between the sleeve and sleeve stop or by other appropriate means.

Second clamp 28 and sleeve retainer 42 are then closed to support mandrel 16. First clamp 24 is opened to permit the transfer of another strand of shirred casing along the mandrel and onto sleeve 38.

While FIGS. 2-5 shows an arrangement wherein the compacted casing stick is doffed from the sleeve 38 of mandrel 16, it should be apparent that other arrangements are possible. For example, a tubular core, a portion of which is shown at 44 in FIG. 4, could be placed in axial alignment with mandrel 16. Here, when the compacted stick is doffed, it will be doffed onto the core. As another alternative, sleeve 38 could be doffed together with the compacted casing frictionally engaged on the sleeve. In either case, the compacted casing grips about the sleeve (or tubular core) and the resulting casing article produced would correspond generally to the cored high density tubular casing article, as more particularly described in the copending Mahoney, et al, patent application, Ser. No. 363,851.

In the cored high density shirred tubular casing article as described in said copending application, the tubular core can be attached to a stuffing apparatus to function as a stuffing horn. In the alternative, the core can be slid over, or otherwise mounted on, a stuffing horn. In either case, it should be appreciated that the inside diameter of the sleeve 38 (or core 44) will represent the desired bore size of the cored article formed according to the present invention.

Figure 6:
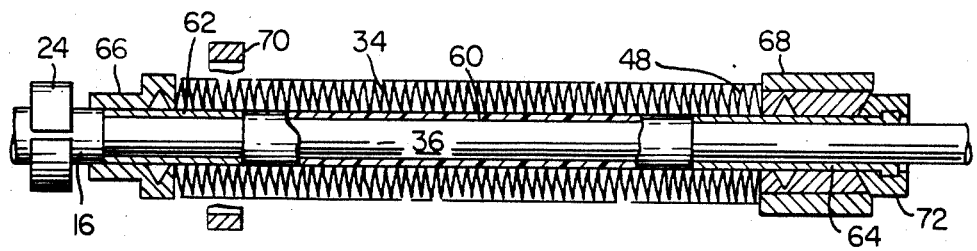
FIGS. 6-8 are views similar to FIGS. 2-5 only showing another embodiment of the invention.

FIG. 6 shows a slightly modified version of the apparatus shown in FIGS. 2-5, which facilitates use of the method of the present invention to manufacture cored, shirred casing articles.

In FIG. 6, first clamp 24 and mandrel 16, including the shaft portion 36 of reduced diameter, are similar to the corresponding components shown in FIGS. 1-5.

Disposed about shaft 36 is a sliding core 60. This core is analogous to the sliding tubular sleeve 38 of FIGS. 1-5. However, the term "core" is used here because this element is intended to be removed from the mandrel with the compacted casing frictionally enaged about the core. Thus, as used with respect to the embodiment shown in FIGS. 6-8, the term "core" refers to an element which forms part of the shirred casing article as made by the apparatus, and this core element is distinguished from a "sleeve" which remains as an element of the apparatus and does not form part of the shirred casing article.

The length of core 60 represents the desired length of the cored casing article to be formed. For various reasons, including economy of manufacture, this core preferably is only slightly longer than the fully compacted length of shirred casing. Consequently, sliding sleeve members 62 and 64 must be provided on either side of the core to make a total length which corresponds generally to the length of sleeve 38 in the embodiment of FIGS. 2-5. Such a longer length is needed to accommodate the strand 34 of partly compacted casing which is moved from the shirring head 12 to the compacting station (FIG. 1).

Sliding sleeve member 62 will be referred to as a transfer sleeve, since it bridges the space between the full diameter of mandrel 16 and core 60 to facilitate the transfer of the shirred casing length onto the core. Sleeve member 64 will be referred to as the retraction sleeve as it retracts, or moves off the shaft 36 to permit doffing of the core.

The apparatus also includes a compactor arm and a second clamp 66, 68, respectively, which are similar in structure and function to the corresponding components of the embodiment of FIGS. 1-5.

In operation, first clamp 24, compactor arm 66, and a core-end pusher 70, are open so that a shirred casing length 34 can slide along the mandrel and onto core 60. Thereafter, the first clamp and compactor arm close while the core-end pusher 70 remains open. Compactor arm 66 then moves the strand of casing along the core until the aft end 48 of the strand abuts second clamp 68, as shown in FIG. 6.

Compaction then continues as described hereinabove with reference to FIGS. 2-5. During such compaction the transfer sleeve 62, core 60, and retraction sleeve 64, function as a unit in a manner analogous to sleeve 38, as previously described, to effect a double-ended simultaneous compaction of strand 34. In this respect, these three members slide along shaft 36 in an aft direction as a unit, depending upon the frictional engagement of the compacting pleats about one or more of the members.

Figure 7:
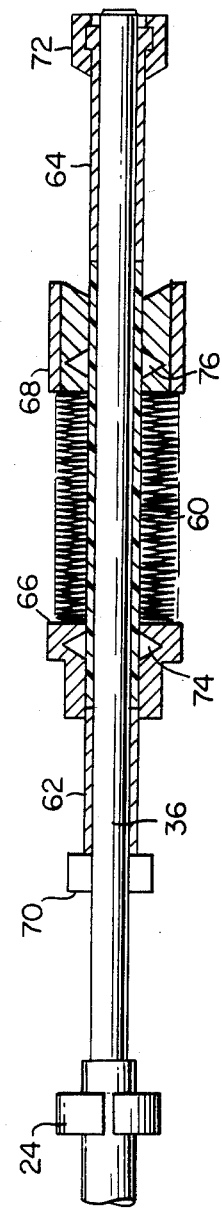

The "sleeve" formed by the three members 62, 60, and 64, slides through second clamp 68 until compaction is complete and the strand of shirred casing, now fully compacted, is frictionally engaged about core 60. This is shown in FIG. 7.

Figure 8:
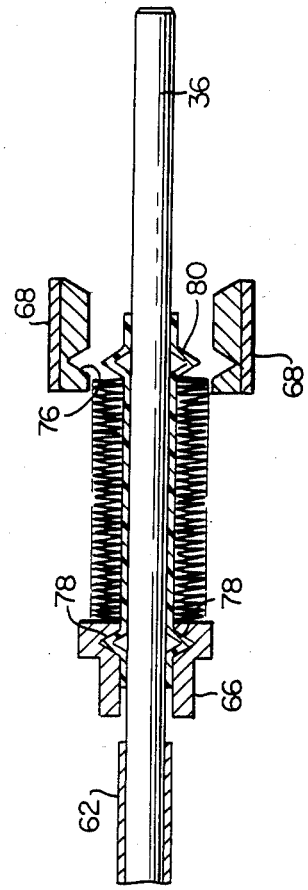

At this point, the cored, shirred casing article can be doffed from shaft 36. This is accomplished by opening clamp 68 and by removing retraction sleeve 64 and a second end pusher 72 from the shaft. With these elements out of the way, compactor arm 66 can push the article, including core 60 and the compacted strand of casing functionally engaged about the core, off of shaft 36 (FIG. 8).

U.S. Pat. No. 4,493,130 describes an arrangement wherein the ends of the compacted casing can be captured to the core, while the casing is subjected to the compacting force. In this manner, the fully compacted (i.e. shortest) casing length is captured. This arrangement, while forming no part of the present invention, can be accomplished by closing core pusher 70 about shaft 36 as shown in FIG. 7. The core pushers 70, 72 are then moved inward. This drives the transfer and retraction sleeves 62, 64, respectively, with equal force against the ends of core 60.

Responsive to this force, a portion of each end of the core buckles or deforms into grooves 74, 76 formed respectively in compactor arm 66 and clamp 68 for this purpose. This buckled portion of core, which forms ribs 78, 80, as shown in FIG. 8, effectively captures the ends of the compacted casing and inhibits axial growth of the casing with respect to the core.

After doffing, the compactor arm 66 and core pusher 70 are opened and returned towards first clamp 24. A new core 60 is placed on shaft 36. Retraction sleeve 64 and core end pusher 72 are then returned to the shaft. Shaft 36 is now ready to receive a fresh strand of shirred casing for production of another cored article.

When making a cored article, selection of an appropriate core material involves consideration of several factors as more particularly discussed in the copending application of Mahoney, et al Ser. No. 363,851. For example, the creep strength of the material must be high enough to resist the forces generated by the compacted casing. Cores having low creep strength would simply stretch or elongate over a period of time, which defeats the purpose of capturing the ends to prevent elongation.

The material must also be strong enough to withstand the compressive forces generated by the tendency of the compacted casing to expand inwardly about the core.

Preferably, the material should have a low coefficient of friction to facilitate compaction of the casing. Capability of cold forming is another desirable property to facilitate formation of the annular rib 78, 80. However, cold forming ability is not essential because an RF heater or other suitable heating means could be used to provide localized heating of the core in the region of the compaction arm and second clamp, if need be, to facilitate buckling of the core material into grooves 74 and 76.

FIG. 9 shows another embodiment wherein two compactor arms are used to apply opposing forces simultaneously to both ends of a strand of shirred casing. In this embodiment, a sliding sleeve would not be necessary. Instead the casing strand 34 is positioned on mandrel 16 between two compactor arms 26 and 26'. Compaction is achieved by simultaneously moving both arms against the ends of the strands in the direction of the arrows 25 and 25' so as to apply substantially equal and opposite forces simultaneously to longitudinally displace both ends of the strand relative to the mandrel 16 and each end towards the other. Here the compactor arms move against and with the ends of the strand so as to affect equal and opposite displacement of each end towards the mipoint of the strand. If both arms are driven by equal forces they will likewise the ends of the strand.

After compaction in this fashion, arm 26' is withdrawn and clamp 28 is opened so that subsequent operation of arm 26 can move the compacted strand off of the mandrel. It should be appreciated that the compacted strand could be doffed onto a core as shown in FIG. 4. It also would be possible to use two compactor arms to compact the strand directly onto a core in a manner similar to the arrangement as shown in FIGS. 6-8.

In order to demonstrate the advantages of the present invention, a series of tests was conducted to compare various aspects of single-ended, single-ended sequential and double-ended simultaneous compaction methods. All tests used casings of like size and all tests used 200 ft. lengths of casing shirred and partly compacted to a strand measuring about 27-30 inches. The shirring machine used was very similar to that described in U.S.

Pat. No. 3,461,484, while imposing a twist to the shirred casing as set forth in U.S. Pat. No. 3,397,069.

EXAMPLE I

A first test was to determine the maximum pack ratio for uncored samples of size 21 casing (about 0.73 inch inflated diameter and wall thickness of 0.001 inch) using each of the three compaction methods. To do this, twenty-five strands of size 21 cellulosic casing, each having a bore diameter of about 0.53 inches, were compacted about a 0.50 inch diameter sleeve. One end of the sleeve was allowed to slide freely through the second clamp of the shirring machine, thereby effectively compacting the casing simultaneously from both ends in accordance with the present invention.

After each strand was compressed, it was examined for pinhole damage. Successive strands of the group of 25 were compacted to varying lengths to determine the shortest compacted length attainable without pinhole damage. This shortest compacted length was used to determine the maximum compressed "average" pack ratio for this compaction method, wherein the calculation was simply:

$$PR = Lc/Ls$$

where
PR = pack ratio
Lc = casing length (200 ft.)
Ls = stick length

In similar fashion, and as a control, maximum "average" pack ratios were determined for single-ended and single-ended sequential compaction methods. In the single-ended sequential method, the strand was first compacted a given length from one end and then turned end-for-end and compacted the same length from the other end. In both control methods, the strands were compacted about a fixed (not sliding) mandrel 0.50 inches in diameter.

The maximum "average" compressed pack ratio attainable in these tests was 142 for double-ended simultaneous compression, 130 for single-ended compression, and 122 for single-ended sequential compression.

EXAMPLE II

A like series of tests was conducted to determine the maximum pack ratios for cored samples. This was done for both compaction directly on a core member (either sliding or fixed) and for compaction about a mandrel (or sliding sleeve) with subsequent transfer to a core member.

The limiting factor for each cored sample was core failure. That is, successive strands, (each containing 200 feet of shirred casing) were compacted to varying lengths to determine the point at which the core failed. The shortest length reached prior to core failure was used to determine the maximum average pack ratio.

The cores on which the strands of size 21 casing were compacted, each had a 0.50 inch O.D. and an I.D. or bore diameter of 0.450 inch. Where the strand was compacted on a mandrel (or sliding sleeve) and subsequently transferred to a core, the O.D. of the mandrel (or sleeve) was slightly larger (0.510 inch) to facilitate subsequent transfer on to the 0.50 inch O.D. cores. An identical series of tests was run using cores made of rigid polyvinylchloride (RPVC) and of high density polyethylene (HDPE).

For compaction on RPVC cores, the maximum average compressed pack ratio was 101 for the double-ended simultaneous method and 90 for each of the control methods. When compacted on a HDPE core, the maximum average compressed pack ratios were 134 for the double-ended simultaneous compression method and 95 for the controls.

The higher pack ratios in each case when using a HDPE core can be attributed to the lower coefficient of friction of HDPE as opposed to RPVC.

When compacting about a mandrel (or sliding sleeve) and then doffing onto a core, the maximum compressed average pack ratio for both the RPVC and HDPE cores was 136 when using the double-ended simultaneous compaction method, 126 for single-ended compaction, and 114 for single-ended sequential compaction.

The results of Examples I and II establish that in each case, the double-ended compaction method of the present invention produced higher average pack ratios than the other methods tested.

EXAMPLE III

All the tests as described in Examples I and II were repeated, only using 200 foot lengths of size 25 cellulosic casing (about 0.83 inflated diameter and wall thickness of about 0.001 inch). The strands of size 25 casing, each having a bore diameter of about 0.61 inch, were compared on a 0.56 inch O.D. mandrel (or sliding sleeve).

When compacting the casing directly on a core, the core O.D. in each case was also 0.56 inch and the I.D. was 0.51 inch. When compacting on a mandrel (or sliding sleeve) and subsequently transferred to a core, the core O.D. was 0.56 inch and the mandrel (or sliding sleeve) O.D. was 0.57 inch. Again, the slightly larger mandrel (sleeve) was to facilitate transfer of the compacted strand to the core.

In each case, as in the previous Examples, compaction according to the method of the present invention resulted in higher pack ratios before evidence of pin hole damage or core failure, than the other methods tested.

The results of Example I–III, that is, the maximum average pack ratios are summarized in Table I. In each case, the maximum average pack ratio was computed by dividing the original casing length (200 feet), by the shortest compacted length (measured while holding the strand in compression) attained without evidence of pinhole damage or core failure.

TABLE I

|  | Uncored | Compacted on Core | | Transferred to Core | |
| --- | --- | --- | --- | --- | --- |
|  |  | RPVC | HDPE | RPVC | HDPE |
| Size 21 |  |  |  |  |  |
| SE | 130 | 90 | 95 | 126 | 126 |
| SESQ | 122 | 90 | 95 | 114 | 114 |
| DESM | 142 | 101 | 134 | 136 | 136 |
| Size 25 |  |  |  |  |  |
| SE | 158 | 94 | 108 | 149 | 149 |
| SESQ | 143 | 101 | 111 | 138 | 138 |
| DESM | 174 | 121 | 170 | 167 | 167 |

SE = Single-ended compaction
SESQ = Single-ended sequential compaction
DESM = Double ended simultaneous compaction
RPVC = Rigid polyvinylchloride
HDPE = High density polyethylene The maximum compressed average pack ratio, as established by Examples I–III for each given set of conditions, was used as a standard in producing compacted strands of casing for subsequent testing. In this respect, and unless otherwise stated, it should be understood that production of compacted strands for evaluating other parameters involved shirring 200 foot lengths of size 21 and size 25 casing and then compacting each shirred strand under a given set of conditions to that compressed length which produced the maximum average pack ratio in Examples I–III for the same set of conditions.

EXAMPLE IV

After determining the maximum average compressed pack ratio, tests were conducted to determine the compressed pack ratio distribution over the length of the compacted strand. This was done by compacting a shirred strand to the appropriate length (i.e., shortest pinhole fee length for uncored samples, and shortest length without core failure for cored samples) for a given set of conditions as established by Examples I–III. While holding the strand at this compressed length, it was marked off in one inch intervals beginning at the compressor arm.

Due to the configuration of the compacting apparatus, it was not possible to measure off increments from end-to-end of the compacted strand. Instead, measurements started and ended about 1½ inches from each end.

After measuring and marking-off each one inch increment of compacted strand, the strand was removed from the compaction apparatus and deshirred. Measurements were then made to determine the amount (length) of casing material contained in each marked off increment. This length was used to determine the distribution of the pack ratio along the stick.

Ten strands compacted according to each method (for both cored and uncored samples) were deshirred and measured to determine the pack ratio at each increment for each compacted strand.

The average pack ratio at each increment, for the ten strand sample, was calculated to provide a profile of an average compacted strand in terms of a pack ratio distribution over the length of the compacted strand. The graphic presentation of the distribution is shown in FIG. 10.

Figure 10A:
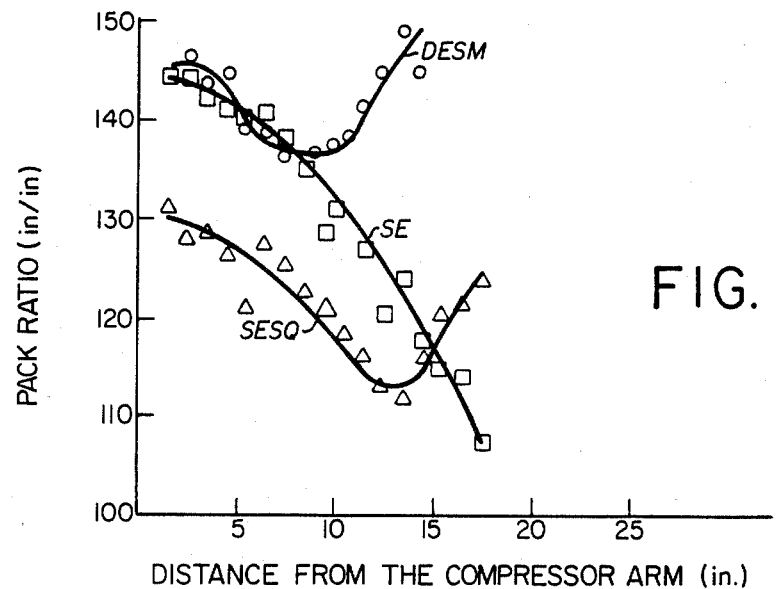
FIGS. 10a-c and 11a-c are graphs showing the average pack ratio distribution along the length of the compacted strands of casing for various compaction methods.

FIG. 10(a) shows the average compressed pack ratio distribution for uncored, size 21 casing compacted according to the single-ended, single-ended sequential and double-ended simultaneous methods.

Figure 10B:
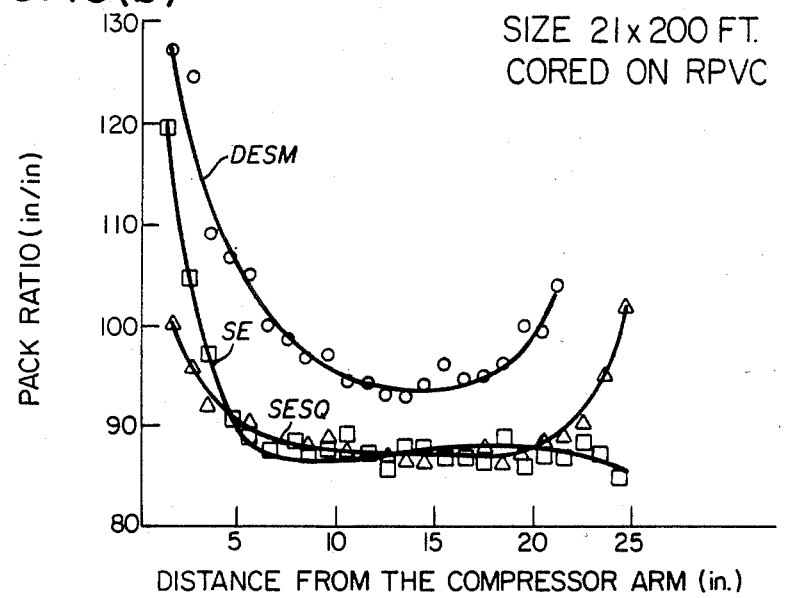
Figure 10C:
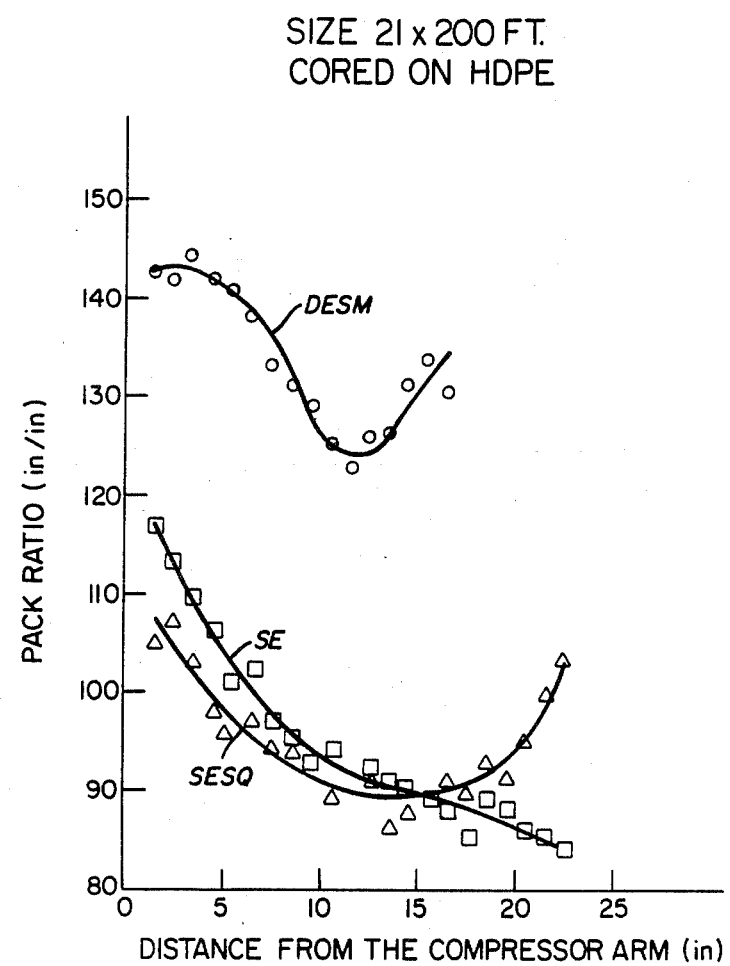

FIGS. 10(b) and 10(c) are similar in that they show the average compressed pack ratios for size 21 casing compacted directly on the RPVC and HDPE cores.

The graphs as shown in FIG. 10 demonstrate that compaction according to the present invention resulted in a compacted strand having, on the average, a higher pack ratio in substantially each increment as compared to strands compacted according to the single-ended or single-ended sequential methods. The lower pack ratios for all methods, attained when using a RPVC core, is attributed to the higher coefficient of friction of RPVC as compared to HDPE.

Figure 11A:
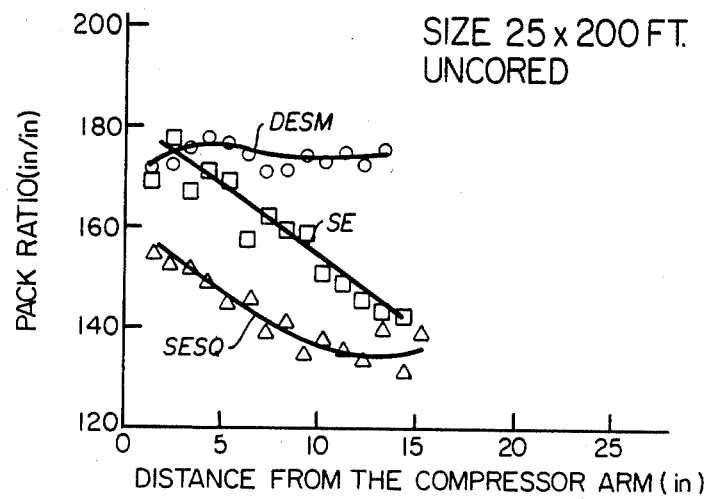
Figure 11B:
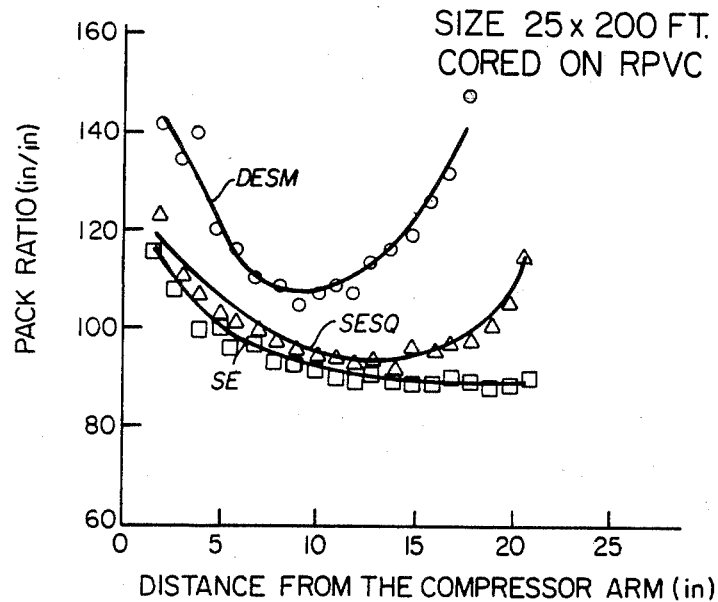
Figure 11C:
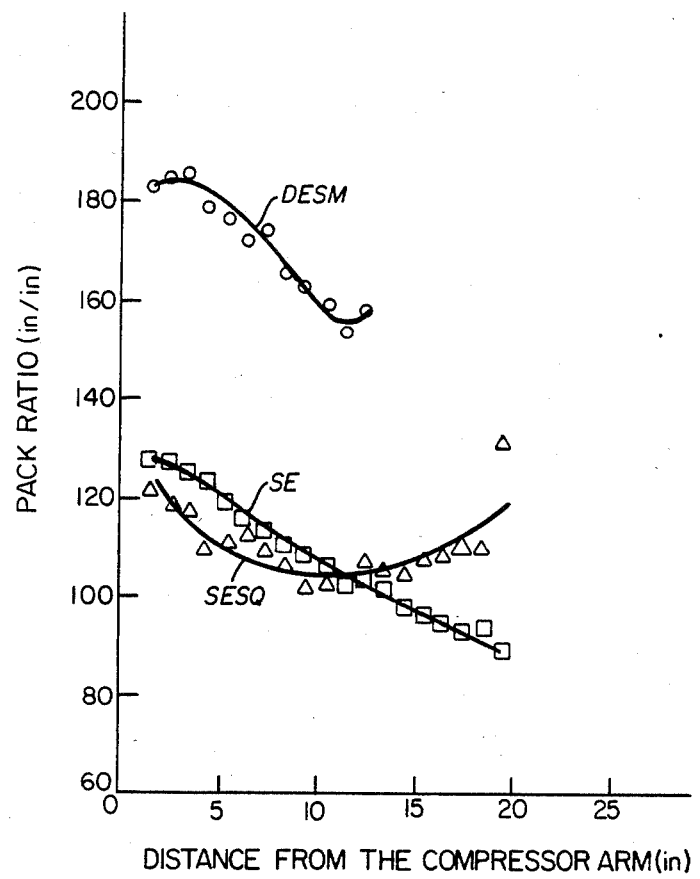
Figure 12A:
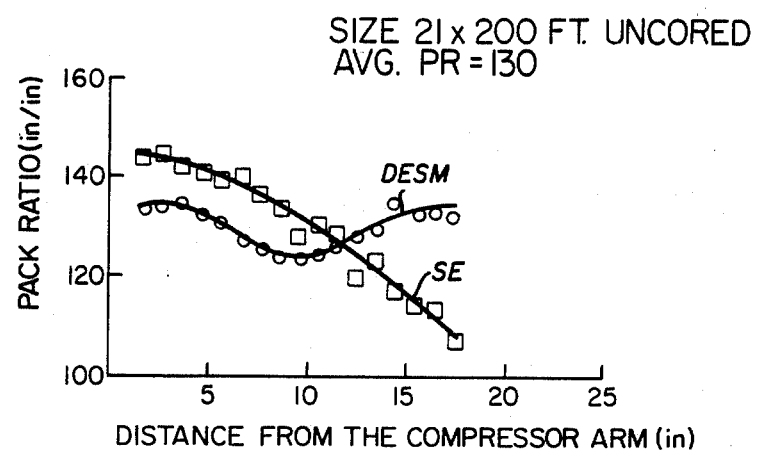
FIGS. 12a-f are a series of curves showing a relative comparison of the uniformity of the average pack ratio distribution for like strands compacted to the same lengths by various compaction methods.
Figure 12B:
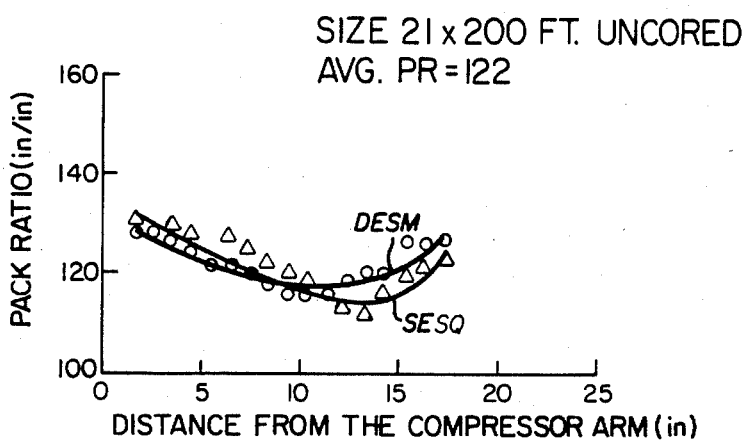
Figure 12C:
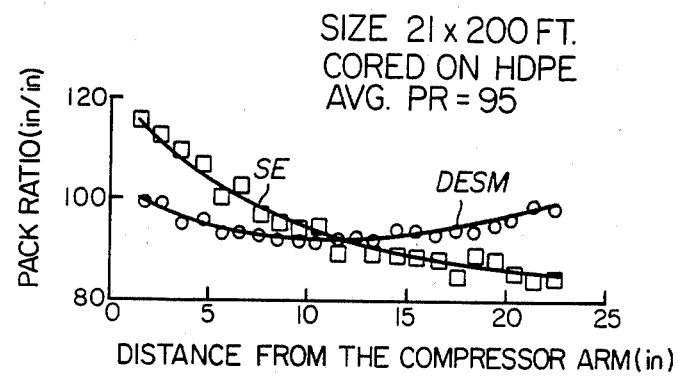
Figure 12D:
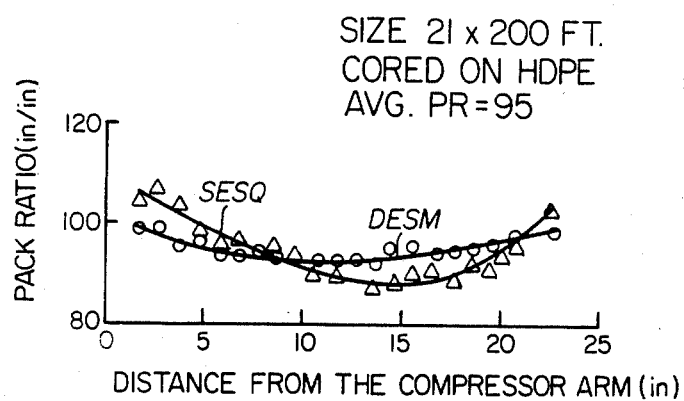
Figure 12E:
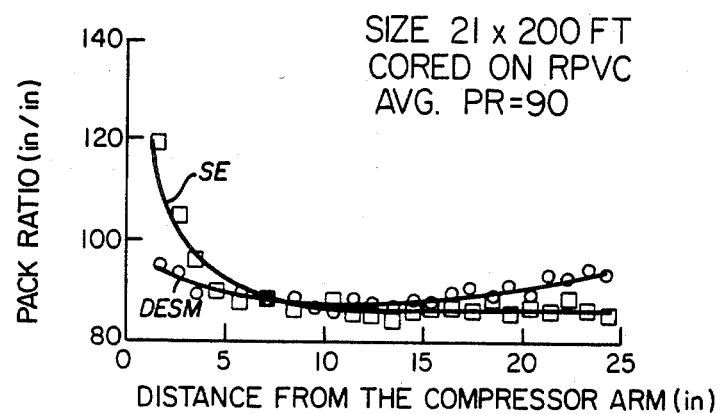
Figure 12F:
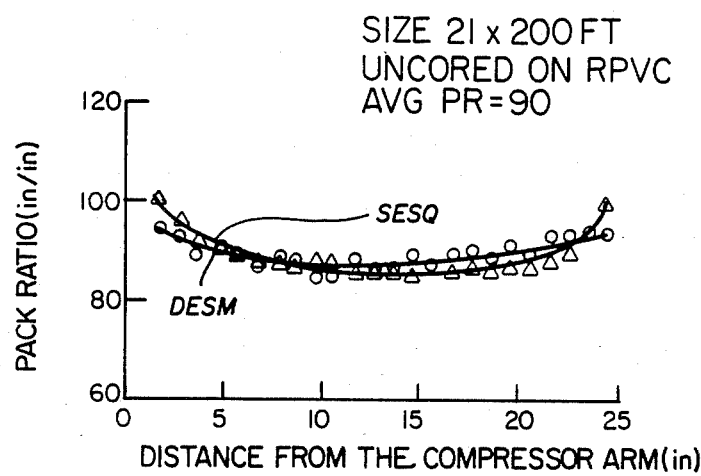

The results of a similar series of tests using Size 25 casing is graphically presented in FIGS. 11a–c. Again, in each case, the method of the present invention achieved a higher average pack ratio at each increment than the control methods.

EXAMPLE V

It should be appreciated that the graphs of FIGS. 10 and 11 illustrate only that the compaction method of the present invention produces an average pack ratio which is higher at each given increment over the length of the strand than the prior art compaction methods tested. These graphs do not illustrate the uniformity of the pack ratio which may be achieved with the present invention as compared to the control methods. To demonstrate such uniformity, as compared to the control methods, ten (10) strands each of size 21 and size 25 casing were compressed to the same lengths (i.e. same average pack ratio) by each of the control methods, and by the method of the present invention. In this way, the maximum average pack ratio, as produced by each control method was duplicated with the double-ended simultaneous compaction method of the present invention.

While under compaction the strands were marked off in one inch increments. The casings were then deshirred to determine the length of casing contained in each increment. When compacted to the same length (i.e. pack ratio), it was found that strands compacted according to the present invention have a pack ratio distribution which generally is more uniform from end-to-end than strands compacted by the control methods. The graphs of the results for the size 21 casing, as shown in FIGS. 12a–f, are also representative of the results for size 25 casing.

EXAMPLE VI

The lengths of uncored compacted strands, which were compacted to the maximum pack ratios as given in Table I, were measured after doffing and again one week later. The lengths of the compacted strands also were measured for purposes of computing the average pack ratio after doffing and again one week later.

The results as set out in Table II show that the pack ratio of strands compacted according to the DESM method remained higher than the control methods both after doffing and after one week. The one week pack ratios of the DESM sticks being greater shows that these sticks were still shorter after one week than the controls.

TABLE II

| | Pack Ratio Doffed and (one week) |
|---|---|
| Size 21 | |
| SE | 115 (108) |
| SESQ | 114 (107) |
| DESM | 125 (116) |
| Size 25 | |
| SE | 136 (126) |
| SESQ | 128 (120) |
| DESM | 150 (134) |

EXAMPLE VII

Uncored samples, after compaction to the maximum pinhole free pack ratio as given in Table I, were held unrestrained for one week. The strands were then marked off in one inch intervals and deshirred to determine the length of casing contained in each one inch interval. The average casing length at like one inch intervals is set out in Table III.

The results show that strands compacted according to the method of the present invention, maintain a higher average pack ratio at given increments over substantially the major portion of length of the strand after one week than strands compacted by the control methods.

Table III shows that the average pack ratio of size 21 strands compacted per the present invention remained above about 113 over a major portion of the strand length. In contrast, strands compacted per the single-ended compression method were at this level for only a small portion of the strand length. The average pack ratio of strands compacted per the single-ended sequential method was below this level over its entire length.

The table shows similar results for size 25 casing where the average pack ratio of strands compacted per the present invention remained above about 130 over a major portion of strand length. Strands compacted per the control methods maintained this average pack ratio for only a small portion of the strand length.

It also should be noted that both the method of the present invention and the single-ended sequential compaction method produced articles wherein the incremental pack ratio on either side of a midpoint of the article was higher than an incremental pack ratio at about the midpoint. However, the table shows that articles produced per the present invention had pack ratios which were higher at each increment over substantially the full length of the article.

TABLE III

| DISTANCE FROM COMPRESSOR ARM (inches) | SE | SESQ | DESM |
|---|---|---|---|
| Size 21 | | | |
| 0.5 | 110.1 | 108.1 | 91.3 |
| 1.5 | 110.3 | 111.5 | 116.2 |
| 2.5 | 113.5 | 111.0 | 117.4 |
| 3.5 | 114.0 | 109.6 | 117.6 |
| 4.5 | 111.8 | 112.0 | 119.8 |
| 5.5 | 115.4 | 108.5 | 117.6 |
| 6.5 | 113.3 | 109.3 | 118.9 |
| 7.5 | 111.1 | 105.1 | 117.4 |
| 8.5 | 113.7 | 107.7 | 115.4 |
| 9.5 | 111.9 | 104.2 | 113.4 |
| 10.5 | 109.5 | 100.3 | 113.8 |
| 11.5 | 107.6 | 111.4 | 115.6 |
| 12.5 | 106.7 | 99.6 | 114.2 |
| 13.5 | 108.2 | 104.3 | 118.0 |
| 14.5 | 104.4 | 103.4 | 118.7 |
| 15.5 | 104.9 | 101.1 | 116.6 |
| 16.5 | 104.1 | 106.9 | 120.8 |
| 17.5 | 101.2 | 103.8 | 120.6 |
| 18.5 | 101.6 | 108.4 | 121.3 |
| 19.5 | 99.6 | 110.2 | 119.0 |
| 20.5 | 95.6 | 110.6 | |
| Size 25 | | | |
| 0.5 | 96.3 | 119.6 | 112.6 |
| 1.5 | 131.2 | 132.8 | 142.1 |
| 2.5 | 139.7 | 129.6 | 138.9 |
| 3.5 | 127.8 | 123.8 | 137.6 |
| 4.5 | 133.8 | 121.9 | 133.0 |
| 5.5 | 136.7 | 123.9 | 138.8 |
| 6.5 | 130.9 | 123.6 | 132.1 |
| 7.5 | 128.6 | 127.6 | 130.8 |
| 8.5 | 130.8 | 118.4 | 137.1 |
| 9.5 | 129.4 | 115.1 | 131.5 |
| 10.5 | 131.1 | 120.8 | 137.4 |
| 11.5 | 125.5 | 117.8 | 134.1 |
| 12.5 | 134.1 | 119.3 | 139.6 |
| 13.5 | 121.1 | 121.6 | 140.6 |
| 14.5 | 122.4 | 117.4 | 132.6 |
| 15.5 | 122.4 | 117.4 | 130.6 |
| 16.5 | 115.7 | 124.5 | 142.3 |
| 17.5 | 118.7 | 118.9 | 120.1 |
| 18.5 | 118.1 | 119.8 | |
| | | 86.4 | |

EXAMPLE VIII

The bores of the strands as compacted in Examples I–III were measured immediately after doffing, and again one week later, using a standard "drop fit" test. Briefly, in a "drop fit" test, the compacted strand is placed over the upper end of a vertical stainless steel rod of known diameter and of a length longer than the compacted strand. The strand is dropped and allowed to fall freely around the rod. If the strand falls to the end of the rod, the test is successful. Rods of various diameters are used with the largest rod over which the strand freely falls for its entire length being the effective internal diameter of the compacted strand, i.e., the "drop fit" diameter.

Table IV gives the average drop fit diameter of ten samples with the number in parenthesis being the one week drop fit. Reference should also be made to Table I which gives the compacted pack ratio for each sample.

The results of the drop fit test as set out in Table IV, show that uncored strands of casing, compacted according to the present invention, even though compacted to higher pack ratios, maintain bore diameters after one week which are equal to, or greater than the bore diameters of strands compacted according to the control methods. This demonstrates that as compared to the control methods, there is less reduction in the bore diameter of strands compacted according to the present invention.

Except for three instances, the same holds true for cored samples. However, the relatively small reduction in bore size in these three instances as negligible in view of the substantially higher pack patios of casing compacted according to the present method, as compared to the lower pack ratios of the control methods (See Table I).

TABLE IV

| | Uncored | Compacted on Core | | Transferred to Core | |
|---|---|---|---|---|---|
| | | RPVC | HDPE | RPVC | HDPE |
| Size 21 | | | | | |
| SE | .448 | .438 | .438 | .438 | .438 |
| | (.427) | (.438) | (.438) | (.438) | (.427) |
| SESQ | .468 | .438 | .438 | .438 | .438 |
| | (.438) | (.438) | (.438) | (.438) | (.427) |
| DESM | .458 | .438 | .427 | .438 | .438 |
| | (.438) | (.438) | (.416) | (.438) | (.438) |
| Size 25 | | | | | |
| SE | .520 | .500 | .500 | .500 | .500 |
| | (.490) | (.500) | (.490) | (.500) | (.490) |
| SESQ | .520 | .500 | .500 | .500 | .500 |
| | (.490) | (.500) | (.490) | (.500) | (.490) |
| DESM | .520 | .500 | .479 | .500 | .500 |
| | (.490) | (.500) | (.468) | (.490) | (.490) |

EXAMPLE IX

Compaction of uncored samples by the present invention and by a single-ended method, provided an opportunity to measure the relative compaction forces generated with each method. In this respect, both of these methods involve a single and continuous movement of a compaction arm in one direction. Since single-ended sequential compaction involves an interrupted movement of the compaction arm, a similar comparison of this method to the method of the present invention could not be made.

In any event, the forces generated by the compaction arm when compacting uncored size 25 casing were measured. The graphs of these forces, as shown in FIG. 13 clearly show that for pack ratios greater than about 100, the method of the present invention exerts less force on the strand of casing than does the single-ended technique.

The graph of the forces generated with the method of the present invention shows a leveling off, and a temporary reduction of the compaction force at about 100 pounds. This can be attributed to the sleeve member beginning to slide responsive to the applied compaction force. During this time the pack ratio increases while the applied force remains substantially constant.

EXAMPLE X

Tests were also conducted using size 2½ and 4 of reinforced, or fibrous, casing. Size 2½ casing has an inflated diameter of about 2.4 inches and a wall thickness of about 0.0036 inches. Size 4 casing has a similar wall thickness and an inflated diameter of about 2.8 inches.

Strands of shirred casing were prepared using 200 foot lengths of each casing. These strands were then subjected to compaction by the single-ended compaction method and by the double-ended simultaneous compaction method, the latter utilizing a sliding sleeve as described hereinabove. Uncored, compacted strands prepared by each method were subjected to testing to determine the maximum compressed pack ratio.

It was found that the double-ended simultaneous compaction method produced a higher average pack ratio without pinhole damage than the conventional single-ended compaction method. For example, size 2½ casing compressed to a pack ratio of about 145 using the double-ended simultaneous method and to a pack ratio of about 137 with the single-ended compaction method. For size 4 casing the pack ratios for the two methods were about 171 and 166 respectively.

It was also found that the strands of fibrous casing compacted according to the present invention maintained a larger bore size (per the drop fit test) after one week than the control method. For size 2½, the mean bore size of the samples was 1.543 inches for the double-ended simultaneous method as opposed to 1.518 inches for the control. For size 4 casing the mean bore sizes were 1.538 inches and 1.516 inches respectively.

Thus it should be appreciated that the present invention provides a method and apparatus for producing a compacted strand, or stick, of shirred casing having a number of desirable and identifiable characteristics. For example, the stick produced according to the present invention will exhibit a more uniformly higher pack ratio, than sticks compacted to the same length with single-ended or single-ended sequential compaction methods.

It also has been demonstrated that the present invention can achieve the same average pack ratio using less applied force than other methods and can achieve higher average pack ratios than the conventional methods used as controls. Even at a higher pack ratio (i.e. greater compaction) strands compacted according to the present invention exhibit no greater reduction in bore size than strands compacted according to the control methods tested.

While the method of the present invention has been described with respect to a machine using a floating mandrel, adaption of a withdrawing mandrel type of machine to perform the present invention would be within the skill of the art. For example, when using a withdrawing mandrel, the sliding sleeve 38 of FIGS. 2-4 could be omitted. The function of this sliding sleeve would be assumed by freeing the withdrawing mandrel so that it will move or slide axially responsive to the frictional engagement of the casing about the mandrel. For producing cored articles, as shown in FIGS. 6-8, on a withdrawing mandrel type of machine, the core could be arranged to move with the mandrel in cases where the mandrel is free to move responsive to the frictional engagement of the casing. In the alternative, the withdrawing mandrel can be held while the core is allowed to slide with respect to the mandrel, as shown in FIGS. 6-8.

Having described the invention in detail, what is claimed as new is:

1. A method for producing a compacted shirred casing stick article comprising the steps of:
    a. locating a strand of shirred casing on a mandrel member extending axially through said strand with said strand of shirred casing having the pleats thereof in engagement about said mandrel member; and
    b. displacing simultaneously, both ends of said strand longitudinally relative to said mandrel member and each towards a mid point of said strand by applying oppositely directed compacting forces to said ends, and thereby displacing and compressing the pleats of said strand progressively and simultaneously in opposite directions axially inward from both said ends against frictional resistance to said displacement produced by attendant increased pressures of said pleats in engagement about said mandrel member.

2. A method as in claim 1 including continuing said displacing step until said strand is formed into a compacted casing stick having the pleats thereof nearly uniformly compacted throughout its length.

3. A method as in claim 2 wherein said displacing step is accomplished by applying substantially equal and opposite compacting forces simultaneously to each end of said strand and thereby moving both of said ends longitudinally with respect to said mandrel member and each towards the other.

4. A method as in claim 1 including:
    a. positioning said strand of shirred casing on said mandrel member between two movable compactor arms and
    b. in said displacing, simultaneously moving said compactor arms each towards the other and against and with said ends so as to affect substantially equal and opposite displacements of both said ends simultaneously relative to said mandrel member and toward a midpoint of said strand.

5. A method as in claim 1 wherein said mandrel member is a straight cylindrical member having an outside diameter greater than the required inside diameter of said casing stick after being doffed from said mandrel member.

6. A method as in claim 1 including continuing said displacing step until said strand is formed into a compacted casing stick and thereafter:
    moving said casing stick longitudinally along said mandrel member and doffing said casing stick therefrom and onto a tubular core axially aligned with said mandrel member with said casing stick entering into a gripping relationship with said tubular core and said tubular core having a cylindrical bore therethrough to accommodate passage of foodstuff to be stuffed into said casing.

7. A method as in any one of the claims 1-6 including continuing said displacing until said strand is compacted to a pack ratio greater than about 100 throughout substantially its entire length between its ends.

8. A method as in claim 1 wherein said mandrel member is a tubular sleeve slidably mounted on a shaft, said displacing step causing the pleats of said strand to frictionally engage about said sleeve.

9. A method as in claim 8 including the step of doffing said sleeve together with the compacted shirred casing frictionally engaged thereon, from said shaft.

10. A method of producing a compacted shirred tubular casing article comprising the steps of:
(a) slidably mounting a sleeve on a shaft of a casing compacting apparatus, the outside diameter of said sleeve being greater than the doffed inside diameter of the tubular casing article;
(b) feeding a strand of shirred casing onto said sleeve;
(c) applying a longitudinal compacting force to one end of said strand while holding a second end of said strand fixed with respect to said shaft; and
(d) allowing said sleeve to slide on said shaft with respect to said second end during the application of said compacting force to said strand.

11. A method as in claim 10 including the steps of:
(a) holding said sleeve with respect to said shaft after the compaction of said strand; and
(b) removing said compacted strand from said sleeve while maintaining said sleeve on said shaft.

12. A method as in claim 11 including the steps of axially aligning a tubular core with said sleeve and doffing said compacted strand from said sleeve and onto said core.

13. A method as in claim 10 wherein said compacting force continues to be applied until said strand is frictionally engaged about said sleeve; and thereafter, doffing said sleeve from said shaft with said strand still frictionally engaged about said sleeve.

14. A method for producing a compacted shirred casing tubular article comprising the steps of:
(a) providing a longitudinally movable mandrel member having an outside diameter greater than the desired inside diameter of the tubular casing article to be formed;
(b) locating a tubular strand of shirred casing on and about said mandrel member;
(c) applying a restraint against a first end of said strand;
(d) applying a longitudinal compacting force to the second end of said strand for displacing said second end towards said first end, the bore of said strand being sufficiently reduced in size as a result of said displacing to cause the pleats of said strand to frictionally engage said mandrel member; and
(e) allowing said mandrel member to slide freely with respect to the restraint applied against said first end during the application of said compacting force, wherein any movement of said mandrel member is solely the result of said frictional engagement and the longitudinal compacting force applied to said strand.

15. A method as in claim 14 including the steps of:
(a) releasing the restraint from the first end of said strand;
(b) holding said mandrel member with respect to said strand; and thereafter
(c) doffing said compacted strand of shirred casing from said mandrel member.

16. A method as in claim 15 including the steps of sliding said doffed compacted strand of shirred casing onto a tubular core, the inside diameter of said core being substantially equal to said desired inside diameter of said tubular casing article.

17. A method as in claim 14 wherein said mandrel member is a sleeve slidably mounted on a fixed shaft, said method including the steps of:
(a) releasing the restraint from the first end of said strand, and
(b) doffing said sleeve, together with the compacted strand of casing frictionally engaged thereon, from said shaft.

18. A method of producing a compacted shirred casing tubular article comprising the steps of:
(a) providing a tubular sleeve having an inside diameter substantially the same size as the bore of the compacted shirred casing tubular article to be formed;
(b) sliding said sleeve onto a mandrel member;
(c) locating a strand of shirred casing on said sleeve and madrel member, said strand having a length which is longer than said sleeve;
(d) restraining a first end of said strand with respect to said mandrel member;
(e) applying a longitudinal compacting force to the second end of said strand to move said second end towards the other, and onto said sleeve to thereby longitudinally compact said strand, and the pleats of said strand constricting inwardly and frictionally engaging about said sleeve responsive to the longitudinal compaction of said strand;
(f) sliding said sleeve with respect to said restrained first end and along said mandrel member in a direction towards said first end to move said first end onto said sleeve, said sliding step being accomplished solely in response to a portion of said compacting force being transferred to said sleeve by the frictional engagement of said pleats about said sleeve; and thereafter
(g) releasing the first end of said strand and sliding said sleeve, with said compacted casing frictionally engaged thereon off of said mandrel member.

19. A method for producing a compacted shirred tubular casing stick article having a desired bore size comprising:
a. locating a strand of shirred casing on a mandrel member extending axially through said strand with the mandrel member having an outside diameter greater than the bore size of the tubular casing stick article to be formed;
b. abutting a first end of said strand against a stop;
c. applying a compacting force to the second end of said strand; and
d. allowing said mandrel member to slide freely with respect to said stop responsive to the application of said compaction force to said strand.

20. Apparatus for compacting a strand of shirred tubular casing to produce a compacted shirred casing stick article comprising:
a. a mandrel member adapted to receive axially thereon a strand of shirred casing having its pleats engaged about said mandrel member;
b. compactor means pressable against the opposite ends of said strand for simultaneously displacing both of said ends longitudinally relative to said mandrel member, and each towards a midpoint of said strand under oppositively directed compacting forces which longitudinally displace and compress the pleats of said shirred strand progressively and simultaneously in opposite directions axially inward from both said ends and against the frictional resistance to said displacement produced by attendant increased pressures of said pleats in engagement about said mandrel member.

21. Apparatus as in claim 20 wherein said compactor means include compactor elements respectively engageable and displaceable against and with the opposite ends of said strand.

22. Apparatus as in claim 21 wherein said compactor means is operable to exert substantially equal and opposite compacting forces against the ends of said strand and thereby to displace said ends substantially equal distances toward a mid point of said strand.

23. Apparatus as in claim 20 wherein said mandrel member is cylindrical and has a uniform outside diameter which is appreciably greater than the required inside diameter of said compacted casing stick after being doffed from said mandrel member.

24. Apparatus as in claim 20 wherein said compactor means comprises a pair of spaced compactor arms positionable to engage therebetween a strand of shirred casing received on said mandrel member said arms being movable each toward the other against and with the opposite ends of said strand and longitudinally relative to said support member so as to displace the pleats of said shirred strand axially inward from both said ends simultaneously.

25. Apparatus as in claim 20 including:
(a) means for supporting a tubular core in axial alignment with said mandrel member, said core having a bore size substantially equal to the desired bore diameter of said compacted casing article to be formed and having an outside diameter not greater than the outside diameter of said mandrel member; and
(b) doffing means for engaging and moving compacted casing axially off of said mandrel member and onto said tubular core.

26. Apparatus for compacting a tubular strand of shirred casing comprising:
(a) a restraint engageable against a first end of a strand of casing received on a mandrel member;
(b) a compactor arm engageable against a second end of said strand for moving said strand second end longitudinally towards said restraint to compact said strand; and
(c) said mandrel member being slidably arranged for longitudinal movement through said restraint during the compaction of said strand wherein the movement of said compactor arm towards said restraint is transmitted to said mandrel through frictional engagement of said strand and mandrel member.

27. Apparatus for compacting a tubular strand of shirred casing to produce a compacted casing article comprising
a. a mandrel adapted to receive axially thereon a strand of shirred casing having the pleats thereof in engagement with said mandrel;
b. a shaft extending axially from an end of said mandrel, the diameter of said shaft being smaller than the diameter of said mandrel;
c. a sleeve slidably mounted on said shaft, said sleeve having one end positioned against said mandrel member and having an outside diameter substantially equal to the diameter of said mandrel;
d. compactor means including a stop located at a position along said shaft and engageable against a first end of said strand, and a compactor arm engageable against a second end of said strand for moving said second end longitudinally towards said stop so as to compact said strand onto said sleeve between said stop and compactor arm; and
e. said stop being arranged to hold said first end with respect to said shaft and yet permit free sliding movement of said sleeve past said stop in response to the engagement between said sleeve and the pleats of said strand and in response to the longitudinal force applied by said compactor arm to the second end of said strand.

28. Apparatus as in claim 27 wherein said sleeve has an inside diameter substantially equal to the desired bore diameter of a compacted casing article to be formed and is removable from said shaft with the compacted strand frictionally engaged about said sleeve to form a cored, compacted casing article, wherein said sleeve defines said core.

29. Apparatus as in claim 28 wherein said sleeve has an axial length longer than the length of said strand after the compaction of said strand.

30. Apparatus for compacting a strand of shirred tubular casing to produce a compacted casing article having a desired bore diameter comprising:
(a) a mandrel member;
(b) a sleeve slidably disposed on said mandrel member, said sleeve being adapted to receive a strand of shirred tubular casing to be compacted;
(c) movable stop means for fixing a first end of said strand with respect to said mandrel member, said stop means allowing the free movement of said sleeve past said stop; and
(d) an axially movable compactor arm engageable against the second end of said strand for moving said second end towards said first end, said strand thereby compacting axially and frictionally engaging about said sleeve for moving said sleeve at least partly past said stop.

* * * * *

UNITED STATES PATENT AND TRADEMARK OFFICE
CERTIFICATE OF CORRECTION

PATENT NO. : 4,578,842

DATED : April 1, 1986

INVENTOR(S) : Algimantas P. Urbutis

It is certified that error appears in the above-identified patent and that said Letters Patent is hereby corrected as shown below:

Col. 3, line 42, change "peak" to --pack--.

Col. 9, line 10, "In its apparatus...characterized by:" should be a new paragraph.

Col. 14, lines 44 to 52 should read as follows:
--the arrows 25 and 25' so as to longitudinally displace both ends of the strand relative to the mandrel 16 and each end towards the other. Here the compactor arms move against and with the ends of the strand so as to affect equal and opposite displacement of each end towards the midpoint of the strand. If both arms are driven by equal forces they will likewise apply substantially equal and opposite forces simultaneously to the ends of the strand.--

Signed and Sealed this

Twenty-fifth Day of November, 1986

Attest:

DONALD J. QUIGG

Attesting Officer     Commissioner of Patents and Trademarks